Jan. 1, 1963
B. L. POWELL
3,071,237
PIPE HANDLING APPARATUS
Filed Jan. 30, 1961
4 Sheets-Sheet 1
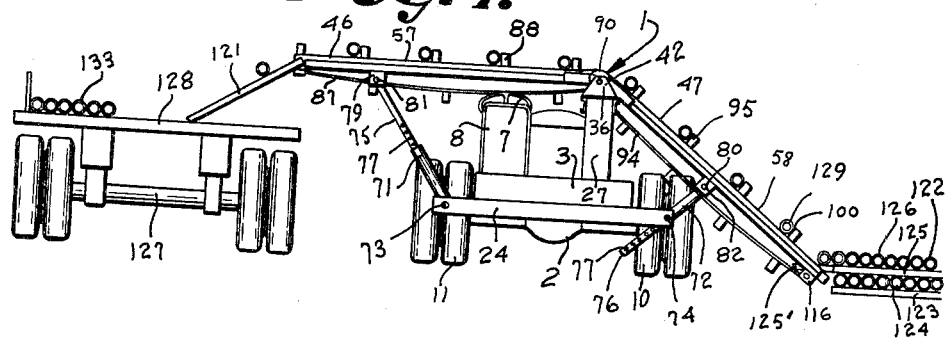
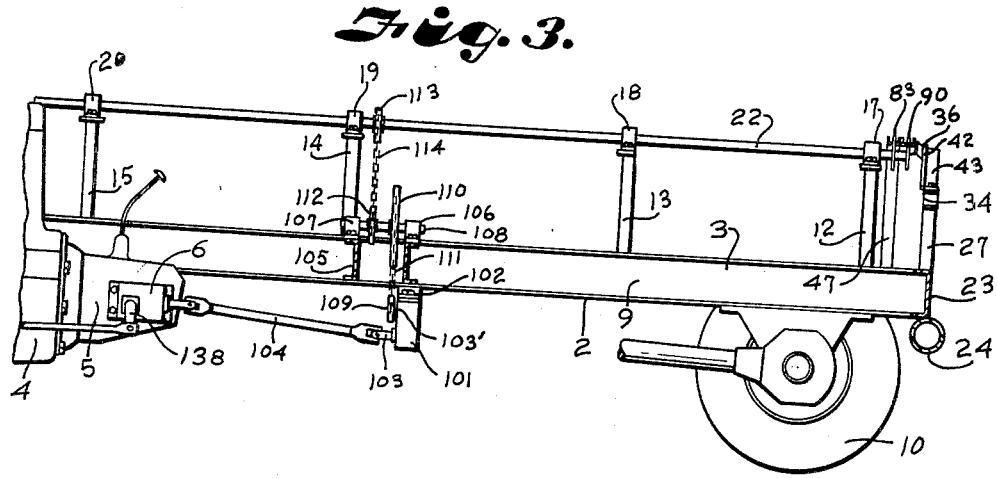
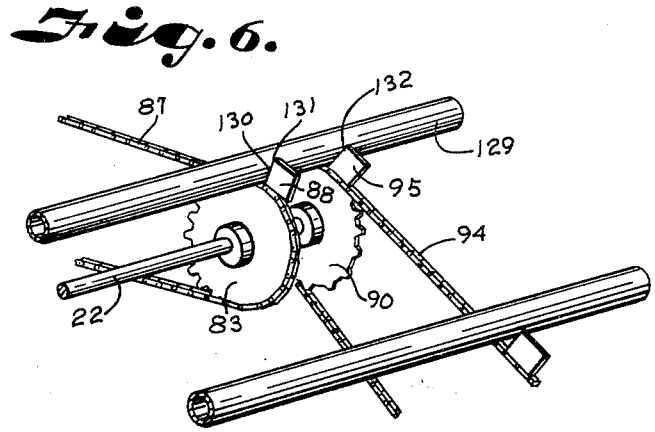
INVENTOR.
BENJAMIN L. POWELL
BY
Fishburn & Gold
ATTORNEYS Jan. 1, 1963

B. L. POWELL 3,071,237

PIPE HANDLING APPARATUS

Filed Jan. 30, 1961

INVENTOR.
BENJAMIN L. POWELL
BY
Fishburn & Gold
ATTORNEYS

Jan. 1, 1963

B. L. POWELL 3,071,237

PIPE HANDLING APPARATUS

Filed Jan. 30, 1961

INVENTOR.
BENJAMIN L. POWELL
BY
Fishburn & Gold
ATTORNEYS

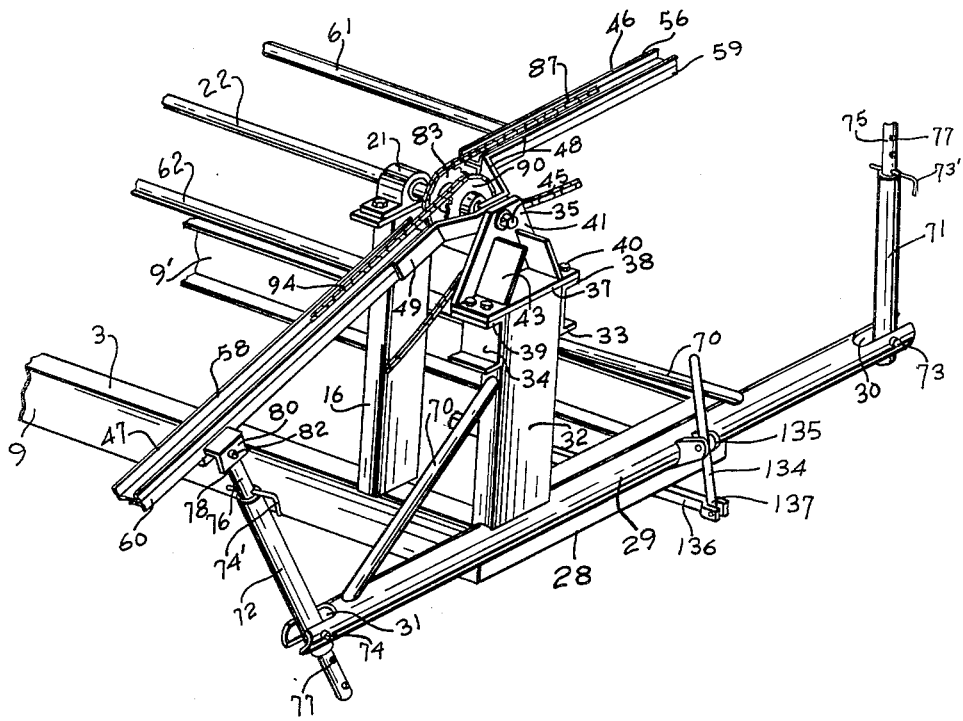

United States Patent Office 3,071,237
Patented Jan. 1, 1963

3,071,237
PIPE HANDLING APPARATUS
Benjamin L. Powell, 3001 N. 73rd St., Bethel, Kans.
Filed Jan. 30, 1961, Ser. No. 85,557
2 Claims. (Cl. 198—91)

This invention relates to pipe handling apparatus, and more particularly to apparatus for moving pipe from one level to another.

Pipe is ordinarily stacked in racks and sometimes on the ground with what is commonly known as 2 x 4's between the pipe layers so as to make it more easy to pick up the pipe when loading to a truck or movement to a different elevation. With large size pipe mechanical means are generally used for loading because of its weight, but in small or medium size pipe oftentimes it is loaded by hand onto a truck or unloaded therefrom which is tiresome as well as dangerous to the men. Casualties often occur in handling pipe by hand due to the weight and length thereof.

It is the principal object of the present invention to provide a mobile apparatus having conveyors mounted centrally of the mobile vehicle and extending from each side thereof and adjustable to different heights having mechanism for picking up the pipe from the pile and delivering it to a different elevation. Other objects of the present invention are to provide for pivotal mounting of the conveyor frames on the frame of the mobile unit adjustable independently one from the other; to provide chain means operable on the conveyors for conveying the pipe from a pile on one pair of conveyors and picking up of the pipe from that conveyor by the chain means on the other pair of conveyors and carrying it to a different elevation such as a truck or the like; to provide for pick up of the pipe from one conveyor off of the other conveyor in such a manner that the chain means from the first conveyor will not interfere with the pipe as the chain means is removed from the pipe and to provide means on the mobile unit for operation of said chains.

Still further objects of the present invention are to provide endless chains on the conveyor having spaced lugs thereon for picking up individual pipe sections and carrying them in spaced relation on one pair of conveyors to the other pair of conveyors; to provide synchronization of the chains on the elevated conveyor so that the lugs thereon will pick the pipe up from the first conveyors and move it slightly ahead of the lugs on the first conveyors so that when it turns over the sprocket at the end of those conveyors the pipe will be far enough removed from the lugs so that the lug will be freely disengaged from the pipe and move therefrom around the sprocket of the conveyors.

Still further objects of the present invention are to provide spaced standards on the mobile unit having pillow block bearings thereon and a shaft rotatable therein; to provide sprockets on the shaft over which the chains of the conveyors run for operating the same; to provide brackets at each end of the vehicle and frame thereof for pivotally mounting the conveyors thereon and to provide a device of this character simple and economical to manufacture.

Other objects and advantages of this invention will become apparent from the following description taken in connection wtih the accompanying drawings wherein are set forth by way of illustrtaion and example certain embodiments of this invention.

FIG. 1 is an end view of the pipe handling apparatus showing one of the conveyors in pick up position and the other in positon to unload onto a truck or the like.

FIG. 3 is a longitudinal cross sectional view particularly illustrating the driving mechanism from the power take-off of the vehicle.

FIG. 6 is an enlarged fragmentary view showing the synchronization of the conveyor chains and sprockets of one conveyor with respect to another.

FIG. 7 is an enlarged perspective partly fragmentary view of the front end mounting of the conveyors.

FIG. 8 is a cross sectional view showing the mounting of the sprockets in the ends of the channels of the unloading end of the conveyors with the skid in disassembled relation.

Figure 2:
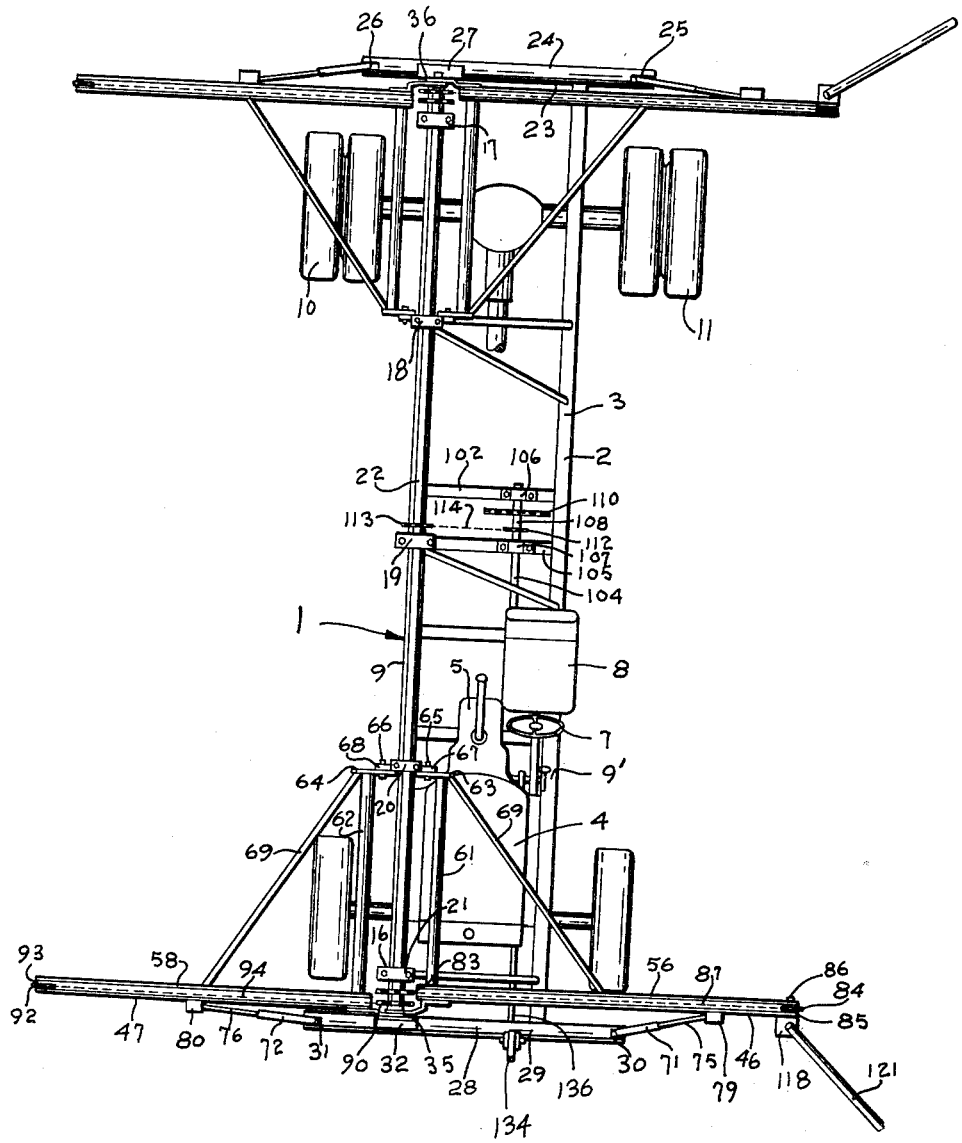
FIG. 2 is a top plan view of the apparatus.

Referring more in detail to the drawings:

1 designates generally a pipe handling apparatus embodying the features of my invention shown mounted upon a vehicle 2 having a frame 3 carrying a motor 4 having a transmission 5 and a power take-off 6. The vehicle also includes driving mechanism including a steering wheel 7 and a seat 8 for the driver for moving the vehicle from place to place.

The frame includes sleepers or frame members 9 and 9' extending longitudinally between the wheels 10 and 11 of the vehicle and mounted on and extending vertically above the sleeper member 9 are spaced bearing standards 12, 13, 14, 15 and 16. These standards may be of channel shape and rigidly mounted by welding or other suitable means on each standard are pillow block bearings 17, 18, 19, 20 and 21 through which a drive shaft 22 extends for a purpose later described.

The frame 3 and particularly the sleeper members 9 and 9' extend outwardly from each end of the vehicle and mounted rigidly on the rear end 23 thereof is a cross bar or tubular member 24 having bifurcated ends 25 and 26. Rigidly secured to and extending upwardly in a vertical direction from the rear end 23 of the frame 3 is an upright channel member or standard 27. Rigidly mounted on the front end 28 of the frame 3 is a cross bar or tubular member 29 of the frame 3, the outer ends being bifurcated as indicated at 30 and 31. Rigidly mounted on the cross bar 29 and extending upwardly therefrom is a channel member or standard 32. The channel members 27 and 32 are in longitudinal alignment with each other and with the sleeper member 9 of the frame as illustrated in FIGS. 2 and 7.

Figure 4:
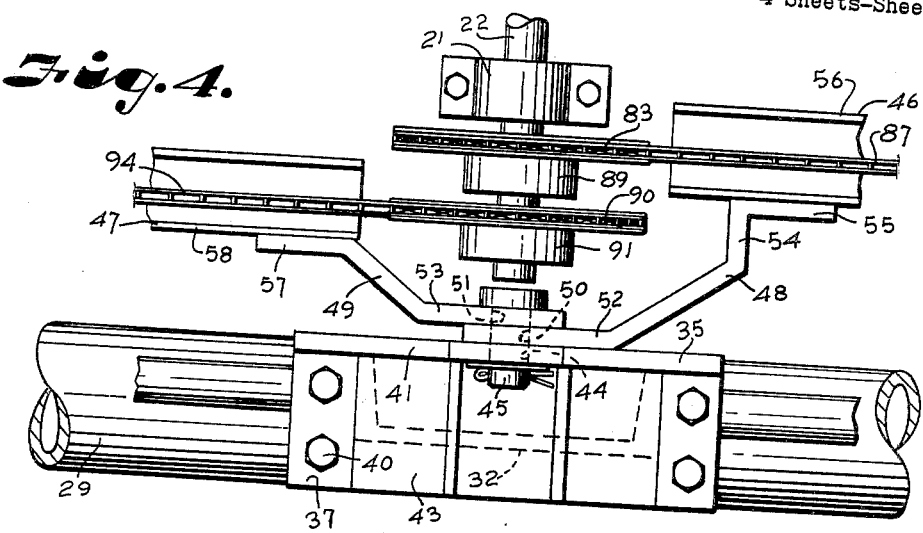
FIG. 4 is an enlarged partly fragmentary top view showing the mounting of the conveyors on the frame of the vehicle.

Rigidly secured to the upper side edges of the channel members 27 and 32 by welding or the like are channel members 33 and 34. Bracket members 35 and 36 having plates 37 are secured to the upper flanges 38 and 39 of the channel members 33 and 34 by bolts or the like 40. The brackets 35 and 36 have upwardly extending arms 41 and 42 and braces 43. The arms 41 and 42 have openings 44 for receiving pins or short shafts 45 for pivotally mounting conveyor elements 46 and 47 on the pins 45 by bracket arms 48 and 49 having aligned openings 50 and 51 for engaging the pins 45 as best illustrated in FIG. 4.

The bracket arms 48 and 49 have parallel extending portions 52 and 53 and the arm 48 is longer than the arm 49 as indicated by the straight portion 54 (FIG. 4) immediately adjoining the leg 55 which is rigidly secured to a channel member 56 of the conveyor element 46 and the leg 57 of the bracket arm 49 is also rigidly secured to a channel member 58 of the conveyor element 47. As these bracket members and mounting of the conveyor elements are the same on each end of the apparatus as shown in FIG. 2, only one has been described but it will here be noted that the conveyor elements 46 are offset slightly from the conveyor elements 47 for a purpose later described.

It will be noted that there are conveyor elements on each end of the vehicle like those 46 and 47 and facing each other and as these are identical in structure, they have been given like numbers.

Rigidly secured to the portions 55 and 57 of the brackets 48 and 49 by welding or other suitable means are angle members 59 and 60 and which extend along the channel members for stiffening the same. Rigidly secured to the inner end of the channel members 56 and 58 by welding or other suitable means are channel bar members 61 and 62 having their other ends rigidly secured to plates 63 and 64 having an end thereof pivotally mounted by pins 65 and 66 to bracket members 67 and 68 rigidly secured to the vertically extending bearing standards 15 and 13 respectively as illustrated in FIG. 2. The conveyor elements 46 and 47 are thus independently pivotally mounted to the bearing standards and to the upright standards or channel members 27 and 32 and to the bracket members 48 and 49 as previously described.

Braces 69 have one end rigidly secured to the plates 63 and 64 and their other ends to the channel members 56 and 58 as illustrated in FIG. 2 to lend rigidity to the conveyor element. The cross bars 24 and 29 are also braced to the frame structure by rods 70 (FIG. 7) having one end attached to said cross bars and the other ends to said end standards 27 and 32.

The conveyor elements 46 and 47 are also supported and are adjustably mounted by extension members 71 and 72 (FIG. 7). The extension members are telescoping and have one end secured to the bifurcated ends 25 and 26 and 30 and 31 of the cross bars 24 and 29 by pins or the like 73 and 74. The telescoping portions 75 and 76 of the extension members have spaced openings 77 therein and have one end 78 pivotally mounted to lugs 79 and 80 depending from the channel members 56 and 58 by pins 81 and 82. In order to adjust the conveyor elements 46 and 47, pins 73′ and 74′ are removed and the conveyor either raised or lowered and the pins inserted in the openings 77 as desired.

The shaft 22 extends outwardly from the bearings 17 and 21 and mounted thereon are sprockets 83 aligned with the channel members 56 and sprockets 84 are mounted in the bifurcated ends 85 of the channel members 56 by pins 86 over which sprockets run endless chains 87. Spaced lugs 88 are secured to certain of the links of the chain as will later more specifically be referred to. Collars 89 are secured to the shaft as shown in FIG. 4 to hold the sprockets 83 in place.

Spaced outwardly from the sprockets 83 and mounted on the shaft 22 are sprockets 90 held thereon by collars 91, the sprockets being aligned with the channel members 58 of the conveyor elements 47. The outer end of the channel members 58 are bifurcated as indicated at 92 and carry sprockets 93 over which along with sprockets 90 are run endless chains 94 which are also provided with spaced lugs 95 as later referred to.

Figure 5:
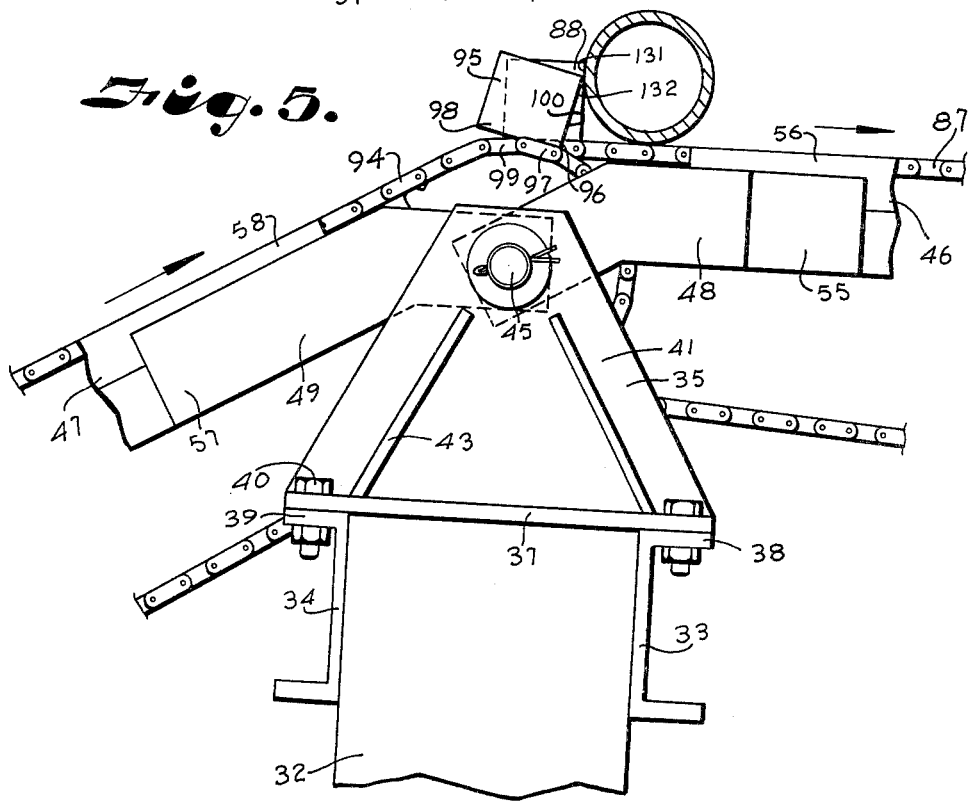
FIG. 5 is an enlarged fragmentary side view particularly illustrating the mounting of the conveyors and the lugs on the chains of the conveyors.

The lugs 88 and 95 are identical and it will be noted that they are of a length as illustrated in FIG. 5 so that one end 96 thereof is secured to a link 97 and has a portion 98 extending over and engaging the next link 99 so that when the face 100 of the lug engages a pipe both links 97 and 99 will resist the pressure of the pipe. In other words, all of the weight will not be on the link 97 but the link 99 will also resist pressure from the pipe against the face 100.

A speed reduction unit 101 is secured to a cross member 102 mounted between the sleeper members 9 and 9′ as illustrated in FIG. 2. The speed reduction unit has an input shaft 103 and an output shaft 103′ wherein the output shaft rotates at a reduced speed from that of the input shaft. The input shaft 103 is connected to the power take-off 6 of the transmission 5 by a universal rod 104 (FIG. 3). A cross member 105 is also secured to the sleeper members 9 and 9′ spaced from the cross member 102 and mounted thereon are bearings 106 and 107 for mounting a shaft 108. Mounted on the output shaft 103′ is a sprocket 109 aligning with a larger sprocket 110 on the shaft 108 over which a chain 111 operates. Also mounted upon the shaft 108 is a sprocket 112 aligning with a sprocket 113 on the shaft 22 and over which a chain 114 engages whereby operation of the motor through the power take-off, shafts and sprockets just described, the shaft 22 will be operated for a purpose later shown.

Mounting of the sprockets 84 and 93 is accomplished by welding or otherwise suitably securing to the outer ends of the channel members 56 and 58 of the conveyor elements 46 and 47 depending brackets 115 and 116 having openings for receiving the shafts 117 of the sprockets 84. The conveyor elements 47 are the pick up conveyors and the conveyor elements 46 are the unloading conveyors. Secured to the bracket 116 of the channel members 56 is an outwardly extending arm 118 having an opening 119 for a pin 120 secured to an arm or skid thus pivotally mounted in the arm 118 for a purpose later shown.

Operation of apparatus constructed and assembled as described is as follows:

In FIG. 1 there is shown a pile of pipe 122. In piling such pipe, skids 123 are placed on the ground or other support and a row of pipe 124 placed on the skids then skid bars such as 2 x 4's 125 are placed thereon and the second row of pipe 126 is then piled thereon. Any number of tiers may be piled as desired. When it is desired to pick up the pipe from the pile 122 and load it on a truck or the like 127 having a bed 128, the vehicle including the loading apparatus is moved alongside the pipe 126 and the conveyor 47 adjusted so that the lower end will be adjacent the edge of the pile of pipe 126, the adjustment being made through the extension members 71 as illustrated in FIG. 1. The truck 127 is then moved to the position alongside the apparatus and the conveyors 46 elevated to the desired height as shown in FIG. 1 with the outer edge thereof about even with the bed 128 of the truck 127.

Operation of the motor 4 of the mobile unit will, through the power take-off shaft and chain and sprocket connection, rotate the shaft 22 and thereby rotate the chains 94 on the conveyor elements 47 in an anti-clockwise direction as shown in FIG. 1. The skid 125 is moved alongside the channel member 58 as shown at 125′ (FIG. 1). A workman will move the pipe 126 along the skid 125 so that it will be picked up by the facing side 100 of the lugs 95 as indicated at 129, FIG. 1. The rotation of the chains may be varied, but the apparatus is adapted to carry a pipe on each lug also as shown in FIG. 1, and when the pipe 129 gets to the top of the conveyor 47 and particularly as shown in FIG. 6, the lugs on the chain 87 of the conveyor 46 also operating in an anti-clockwise direction as shown in FIGS. 1 and 6 will also engage the pipe 129 as indicated at 130 (FIG. 6). The chains 94 on the conveyors 47 are synchronized so that the lugs 95 are in alignment transversely of the vehicle so that the pipe will ride in a straight line upwardly. The chains 87 on the conveyors 46 are also synchronized with each other but are slightly out of synchronization with the chains on the conveyors 47. In other words, the lugs 88 on the chains 87 operating over the sprocket 83 on the shaft 22 will contact the pipe at its outer edge 131 and then move the pipe slightly forwardly of the lugs 95 also as illustrated in FIG. 6 so that when the sprockets 90 rotate further the lugs 95 must turn downwardly to move underneath the conveyor and the pipe will be moved far enough ahead so that the upper side face 132 will readily disengage from the pipe.

The pipe will be moved forwardly enough that the lug 95 will not wear against the pipe by friction therewith.

When the pipe 129 moves across the conveyor 46 the lugs on the chain moving around the sprocket 84 on the outer end of the conveyor elements 46 will allow the pipe to roll therefrom onto the arms or skids 121 where they will skid or roll to the platform 128 and be loaded thereon as indicated at 133, FIG. 1. The arm 121 is pivoted so that it is swingable to the side so that the entire bed of the truck may be loaded without moving either the truck or the loading apparatus.

Control of operation of the chains on the conveyor elements is accomplished by a lever 134 pivoted on a bracket 135 rigidly mounted on the cross bar 29. A rod 136 is pivotally connected to the lower end 137 of the lever 134 and extends underneath the frame 3 and alongside the motor 4 and is pivotally connected to an arm 138 of the power take-off 6. When the motor 4 is started then the operator of the apparatus may by manipulation of the lever 134 control movement of the conveyor chains which carry the pipe on the conveyor elements.

It will be obvious from the foregoing that I have provided an improved pipe loading apparatus wherein the pipe is easily and quickly moved from one elevation to another with few workmen and without danger of harm to such workers.

It will be obvious that pipe may be moved from a higher elevation to a lower level with my apparatus by reversing the operation of the conveyor chains or by changing the location of the mobile unit so that the conveyor elements 47 will be located adjacent the truck bed or other higher elevation.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. Apparatus for transferring pipe or the like from one level to another comprising, an elongated frame, bearing standards spaced longitudinally of said frame, a shaft rotatably mounted on said standards and extending longitudinally of said frame, a first pair of spaced parallel elongated conveyor elements extending laterally and radially of said shaft, a second pair of spaced parallel elongated conveyor elements extending laterally and radially of said shaft and on the opposite side of said shaft from said first pair of conveyor elements, said conveyor elements each having an inner end and an outer end, means on said frame for mounting said inner ends of said conveyor elements adjacent said shaft for pivotal movement of said conveyor elements about said shaft, means on said frame for selectively maintaining said pairs of conveyors in pivoted positions with respect to said shaft, a sprocket rotatably mounted on said outer end of each of said conveyor elements, spaced pairs of shaft sprockets rotatably fixed to said shaft and respectively aligned with said outer end sprockets, endless chains respectively engaged with each of said outer end sprockets and with an aligned shaft sprocket, aligned spaced lugs on the chains of the first pair of conveyor elements, aligned spaced lugs on the chains of the second pair of conveyor elements, the first-named spaced lugs respectively being positioned with respect to the last-named spaced lugs in overlapping but slightly lagging relation longitudinally of said conveyor elements when said lugs are simultaneously passing over said shaft sprockets, whereby said last-named lugs move the pipe forwardly of said first-named lugs to permit said first-named lugs to move around said shaft without further contact with the pipe.

2. The apparatus of claim 1 wherein said lugs are elongated and extend parallel to the respective chains and have one end thereof respectively fastened to one link of the chain and the other end freely contacting an adjacent link to provide support for the lug and permit said other end to move away from said other link when passing over the respective sprockets, whereby said chain rides freely on the sprockets.

References Cited in the file of this patent
UNITED STATES PATENTS

| | | |
|---|---|---|
| 530,296 | Aiken | Dec. 4, 1894 |
| 2,776,763 | Meyer et al. | Jan. 8, 1957 |
| 2,778,477 | Lundahl | Jan. 22, 1957 |
| 2,951,577 | Wilcoxen | Sept. 6, 1960 |